(12) United States Patent
Lee et al.

(10) Patent No.: US 12,148,228 B2
(45) Date of Patent: Nov. 19, 2024

(54) VEHICLE ENTRY DETECTION

(71) Applicant: QUALCOMM Incorporated, San Diego, CA (US)

(72) Inventors: Mingu Lee, Hwaseong (KR); Wonil Chang, Seoul (KR); Yeonseok Kim, Bucheon-si (KR); Kyu Woong Hwang, Daejeon (KR); Yin Huang, Beijing (CN); Ruowei Wang, Beijing (CN); Haijun Zhao, Beijing (CN); Janghoon Cho, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 842 days.

(21) Appl. No.: 17/274,602

(22) PCT Filed: Oct. 8, 2019

(86) PCT No.: PCT/CN2019/109898
§ 371 (c)(1),
(2) Date: Mar. 9, 2021

(87) PCT Pub. No.: WO2020/073881
PCT Pub. Date: Apr. 16, 2020

(65) Prior Publication Data
US 2022/0067479 A1    Mar. 3, 2022

(30) Foreign Application Priority Data

Oct. 8, 2018   (WO) ................ PCT/CN2018/109262

(51) Int. Cl.
*G06V 20/59*    (2022.01)
*G01C 21/36*    (2006.01)
(Continued)

(52) U.S. Cl.
CPC ......... *G06V 20/59* (2022.01); *G01C 21/3688* (2013.01); *G06N 3/02* (2013.01); *G06N 7/01* (2023.01); *G06V 10/764* (2022.01)

(58) Field of Classification Search
CPC .. G06V 20/59; G06V 10/764; G01C 21/3688; G06N 3/02; G06N 3/044; G06N 3/045; G06N 3/088; G06N 7/01
See application file for complete search history.

(56) References Cited

U.S. PATENT DOCUMENTS 10,030,880 B2 *   7/2018   Matsuoka ................ H04Q 9/00
10,690,369 B2 *   6/2020   Matsuoka .......... G05D 23/1902
(Continued)

FOREIGN PATENT DOCUMENTS

CN    106293032 A    1/2017
CN    106529387 A    3/2017
(Continued)

OTHER PUBLICATIONS

Supplementary European Search Report—EP19870824—Search Authority—The Hague—Jul. 11, 2022.
(Continued)

*Primary Examiner* — Russell Frejd
(74) *Attorney, Agent, or Firm* — QUALCOMM Incorporated

(57) ABSTRACT

Certain aspects of the present disclosure are generally directed to apparatus and techniques for event state detection. One example method generally includes receiving a plurality of sensor signals at a computing device, determining, at the computing device, probabilities of sub-event states based on the plurality of sensor signals using an artificial neural network for each of a plurality of time (Continued)

intervals, and detecting, at the computing device, the event state based on the probabilities of the sub-event states via a state sequence model.

30 Claims, 8 Drawing Sheets

(51) Int. Cl.
*G06N 3/02* (2006.01)
*G06N 7/01* (2023.01)
*G06V 10/764* (2022.01)

(56) References Cited

U.S. PATENT DOCUMENTS

| | | | |
|---|---|---|---|
| 11,335,438 B1* | 5/2022 | DePristo | G06N 3/04 |
| 11,496,507 B2* | 11/2022 | Yamada | H04L 63/1466 |
| 11,521,641 B2* | 12/2022 | Ando | G06F 40/20 |
| 11,875,250 B1* | 1/2024 | Xia | G06F 16/583 |
| 2013/0245986 A1 | 9/2013 | Grokop et al. | |
| 2016/0253594 A1 | 9/2016 | Chowdhary et al. | |
| 2016/0297324 A1 | 10/2016 | Taylor et al. | |
| 2017/0036673 A1 | 2/2017 | Lee | |
| 2017/0088072 A1* | 3/2017 | Curtis | G08B 31/00 |
| 2017/0217390 A1* | 8/2017 | Curtis | G08B 21/24 |
| 2017/0270406 A1 | 9/2017 | Visser et al. | |
| 2017/0344893 A1 | 11/2017 | Adi et al. | |
| 2018/0189466 A1 | 7/2018 | Raviv et al. | |
| 2018/0231979 A1 | 8/2018 | Miller et al. | |

FOREIGN PATENT DOCUMENTS

| | | |
|---|---|---|
| CN | 107886103 A | 4/2018 |
| CN | 107924523 A | 4/2018 |
| CN | 108319960 A | 7/2018 |
| EP | 3290869 A2 | 3/2018 |
| WO | 2017040929 A1 | 3/2017 |

OTHER PUBLICATIONS

International Search Report and Written Opinion—PCT/CN2018/109262—ISA/EPO—Jun. 28, 2019.
International Search Report and Written Opinion—PCT/CN2019/109898—ISA/EPO—Jan. 10, 2020.

* cited by examiner

VEHICLE ENTRY DETECTION

CROSS REFERENCE TO RELATED APPLICATIONS

This application is a national stage application under 35 U.S.C. 371 of PCT/CN2019/109898, filed Oct. 8, 2019, which claims priority to PCT Application No. PCT/CN2018/109262, filed Oct. 8, 2018, which are assigned to the assignee hereof and hereby expressly incorporated by reference herein in their entireties as if fully set forth below and for all applicable purposes.

INTRODUCTION

Field of the Disclosure

Certain aspects of the present disclosure generally relate to apparatus and techniques for event state detection.

BACKGROUND

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

In layered neural network architectures, the output of a first layer of neurons becomes an input to a second layer of neurons, the output of a second layer of neurons becomes an input to a third layer of neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure are generally directed to apparatus and techniques for event state detection. One example method generally includes receiving a plurality of sensor signals at a computing device, determining, at the computing device, probabilities of sub-event states based on the plurality of sensor signals using an artificial neural network for each of a plurality of time intervals, and detecting, at the computing device, an event state based on the probabilities of the sub-event states via a state sequence model.

Certain aspects are directed to an apparatus for event state detection. The apparatus generally includes a plurality of sensors and a processing system configured to receive a plurality of sensor signals from the plurality of sensors, determine probabilities of sub-event states based on the plurality of sensor signals using an artificial neural network for each of a plurality of time intervals, and detect an event state based on the probabilities of the sub-event states via a state sequence model.

Certain aspects are directed to an apparatus for event state detection. The apparatus generally includes means for receiving a plurality of sensor signals, means for determining probabilities of sub-event states based on the plurality of sensor signals using an artificial neural network for each of a plurality of time intervals, and means for detecting an event state based on the probabilities of the sub-event states via a state sequence model.

Certain aspects are directed to a computer-readable medium having instructions stored thereon to cause a computing device to receive a plurality of sensor signals, determine probabilities of sub-event states based on the plurality of sensor signals using an artificial neural network for each of a plurality of time intervals, and detect an event state based on the probabilities of the sub-event states via a state sequence model.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
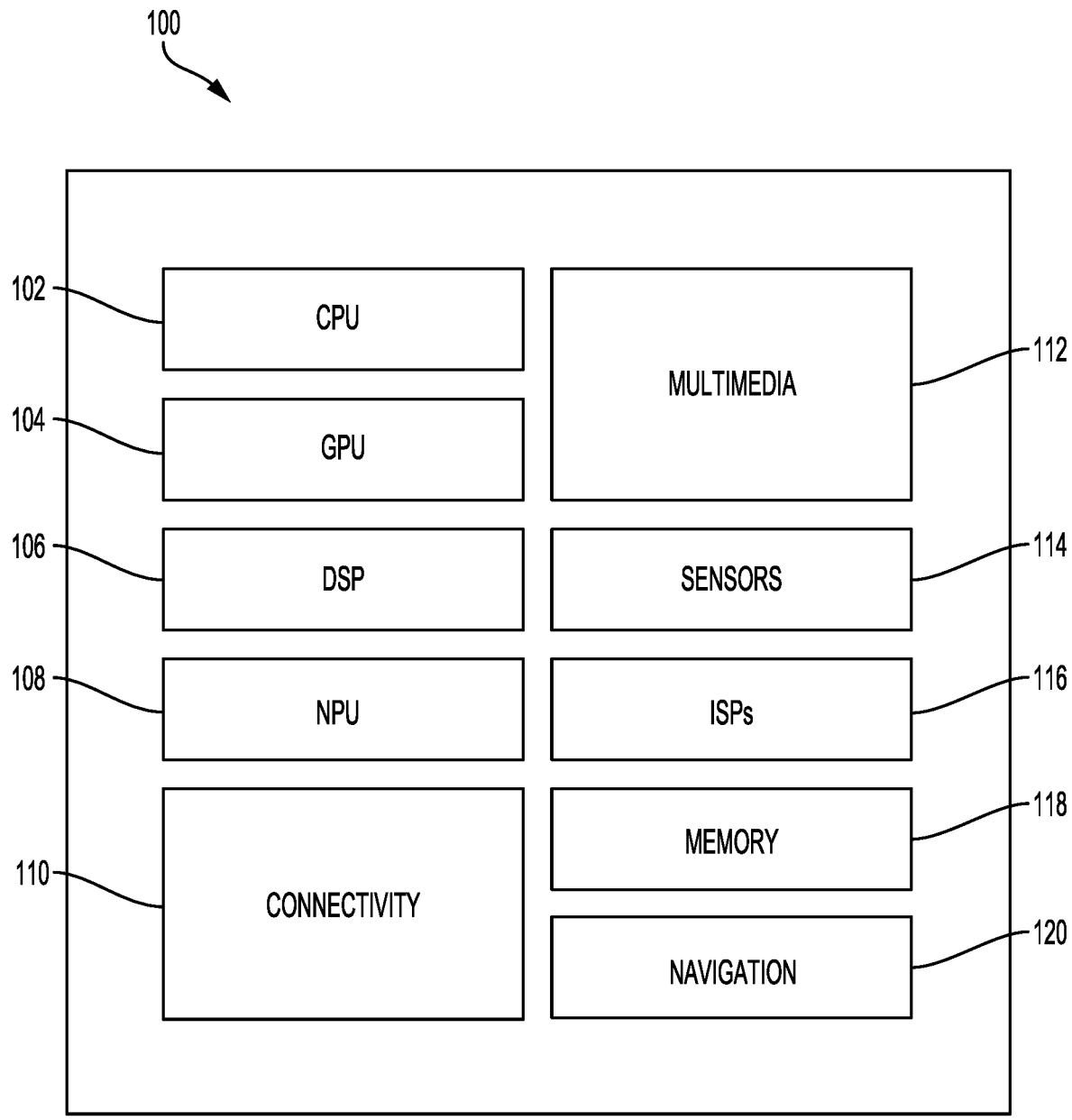
FIG. 1 illustrates an example implementation of a system-on-a-chip (SOC).

FIG. 1 illustrates an example implementation of a system-on-a-chip (SOC) 100, which may include a central processing unit (CPU) 102 or a multi-core CPU configured to perform fast multiply-accumulate (MAC) operations in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth® connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120 (also referred to as a "navigation system"), which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input feature value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input feature and the filter weight when a lookup table miss of the multiplication product is detected.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
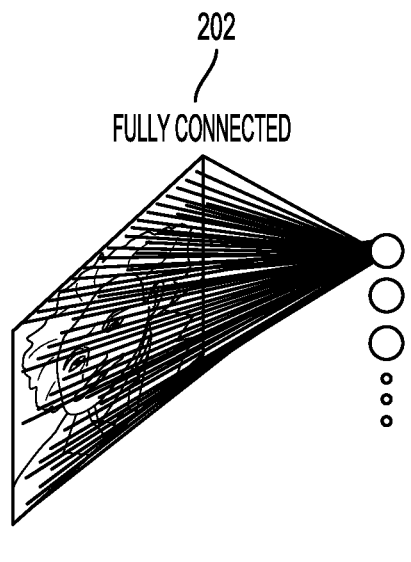
FIG. 2A illustrates an example of a fully connected neural network.
Figure 2B:
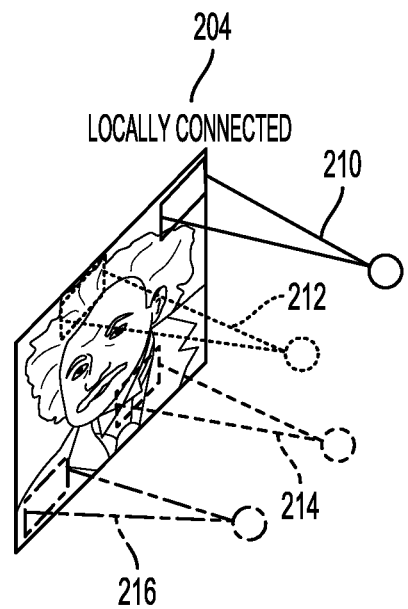
FIG. 2B illustrates an example of a locally connected neural network.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connection strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
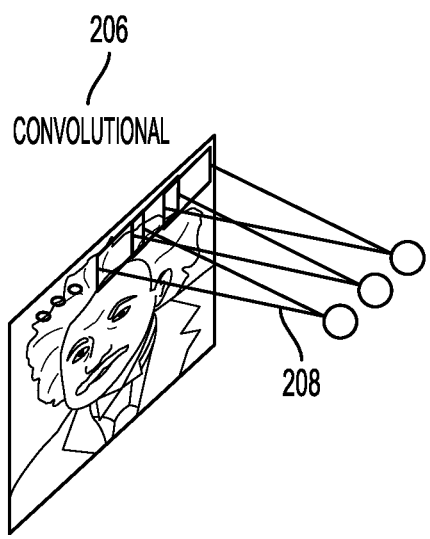
FIG. 2C illustrates an example of a convolutional neural network.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
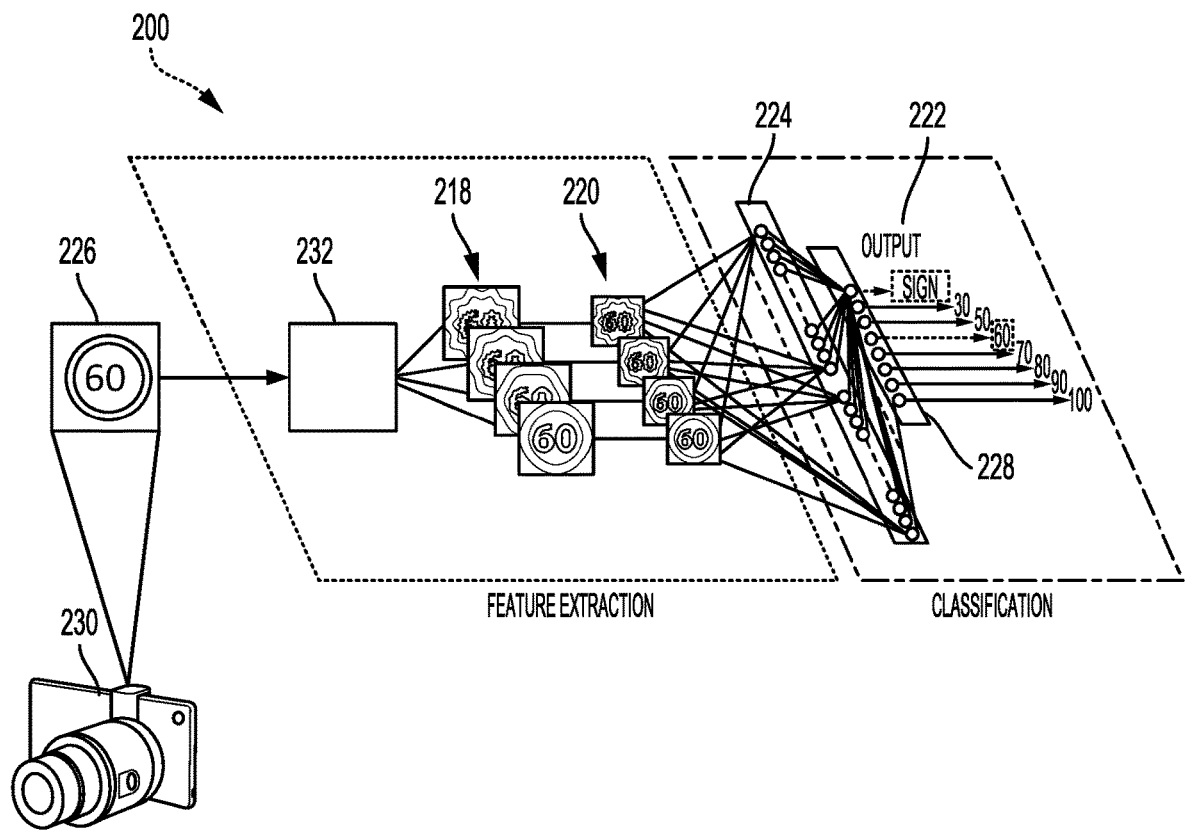
FIG. 2D illustrates a detailed example of a deep convolutional network (DCN) designed to recognize visual features from an image input from an image capturing device, such as a vehicle-mounted camera

One type of convolutional neural network is a deep convolutional network (DCN). FIG. 2D illustrates a detailed example of a DCN 200 designed to recognize visual features from an image 226 input from an image capturing device 230, such as a vehicle-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
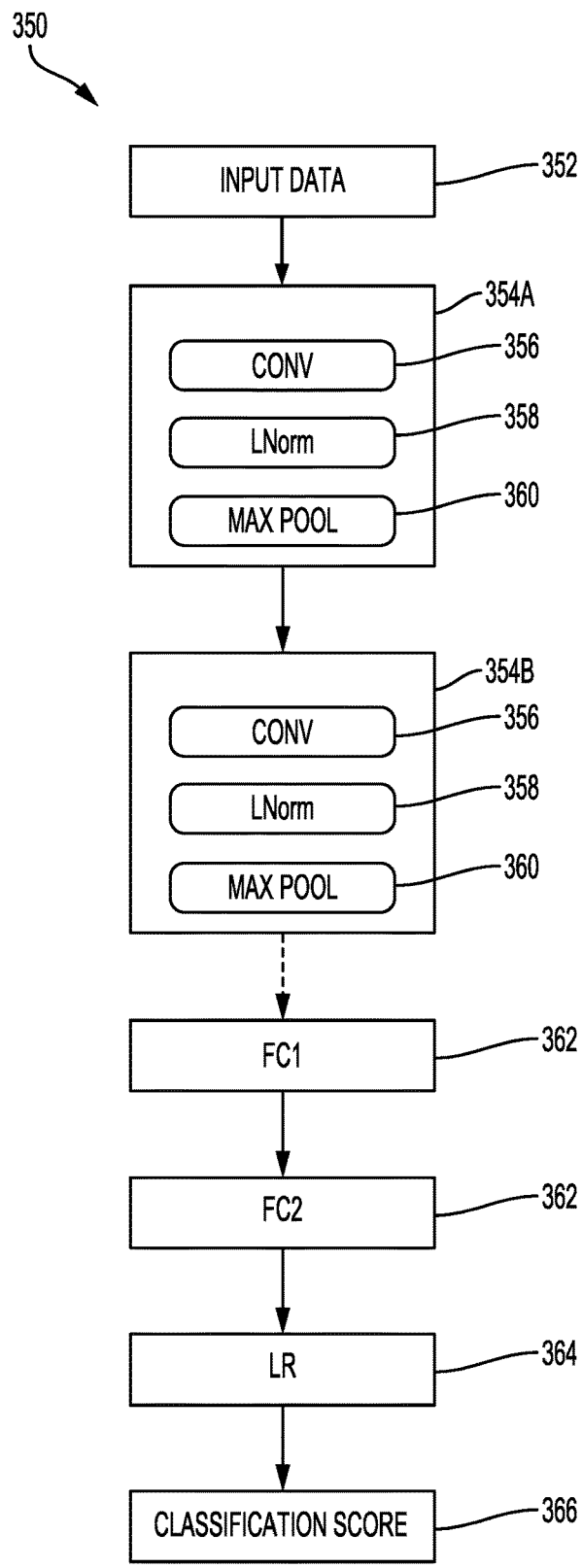
FIG. 3 is a block diagram illustrating a DCN.

FIG. 3 is a block diagram illustrating a deep convolutional network 350. The deep convolutional network 350 may include multiple different types of layers based on connectivity and weight sharing. As shown in FIG. 3E, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
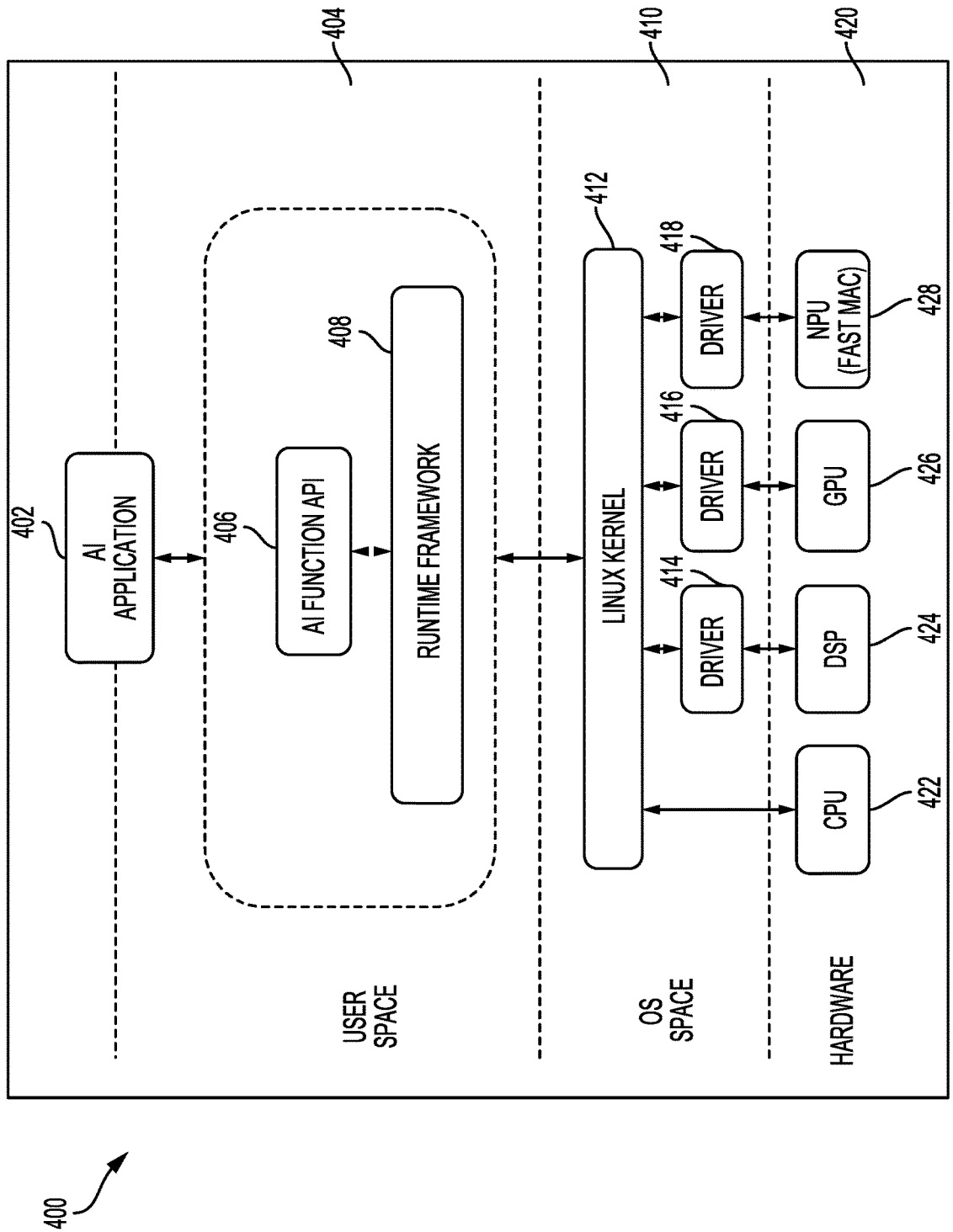
FIG. 4 is a block diagram illustrating an exemplary software architecture that may modularize artificial intelligence (AI) functions.

FIG. 4 is a block diagram illustrating an exemplary software architecture 400 that may modularize artificial intelligence (AI) functions. Using the architecture, applications may be designed that may cause various processing blocks of an SOC 420 (for example a CPU 422, a DSP 424, a GPU 426 and/or an NPU 428) to support fast multiply-accumulate (MAC) computations during run-time operation of an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Linux Kernel 412, running on the SOC 420. The operating system, in turn, may cause a fast MAC computation to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

Example Techniques for Vehicle Entry Detection

If a mobile/wearable device knows that a user is in a vehicle, various useful services may be provided to the user. For example, the device may activate the global-positioning system (GPS), provide (display) other relevant information to the user, or transmit an indication to the vehicle to perform one or more actions. A mobile device may assume that a user is in a vehicle via, for example, a Bluetooth® connection. However, the device should be turned on for the connection, and a user may be out of the vehicle even when the device is connected to the vehicle via Bluetooth®. Detection of vehicle entry using a single modality (e.g., accelerometer or audio) may be restrictive and unreliable. For example, a single modality technique involving audio may include many corner cases in which an audio-only detection algorithm may not work, such as a strong or unforeseen noise environment.

Certain aspects of the present disclosure are generally directed to vehicle entry detection with a mobile or wearable device using early fusion of multiple sensor signals, without any network connection such as Bluetooth® or Wi-Fi. For example, certain aspects provide a method and system for low power automatic detection of a user entering a vehicle using multi-sensor fusion, without any connectivity to the vehicle electronics.

Continuous signal streams from multiple sensors may be received and synchronized. The signal streams from the sensors may be fused through a frame-level fusion feature, which may be calculated from the signal streams having different sampling rates. Using a state model, which may be implemented at an output of a fusion layer, a probability of occurrence of each of multiple sub-event states (e.g., walking/stopped/open door/sitting/closed door) may be calculated for each time frame. From the sequence of sub-event state probabilities, a confidence value may be calculated to determine a final state (e.g., user action such as 'entered a car') using a sequence model. In certain aspects, a subset of the sensor signals may be motion signals, which may be used along with one or more audio signals to determine the probabilities of the sub-event states, as described in more detail herein.

Figure 5:
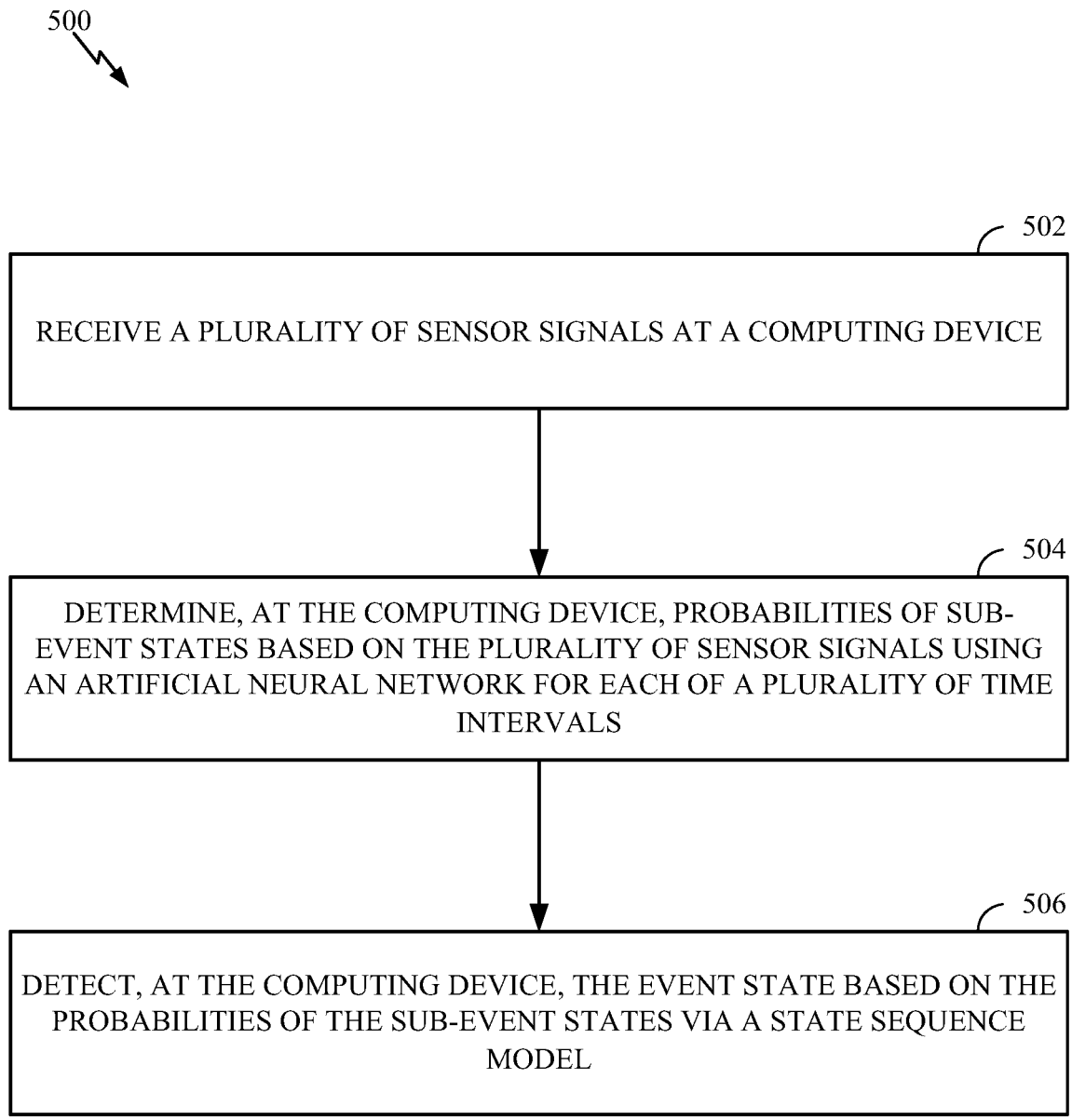
FIG. 5 is a flow diagram of example operations for event state detection, in accordance with certain aspects of the present disclosure.

FIG. 5 is a flow diagram of example operations 500 for event state detection, in accordance with certain aspects of the present disclosure. The operations 500 may be performed by a computing device, such as a mobile device or a wearable device. For example, the operations 500 may be performed by one or more controllers (e.g., DSP 106) of the SOC 100.

The operations 500 may include, at block 502, the computing device receiving a plurality of sensor signals. For example, the plurality of sensor signals may include an audio signal and at least one motion sensor signal. In certain aspects, the at least one motion sensor signal may include at least one of an accelerometer sensor signal, a gyroscope sensor signal, or a magnetometer sensor signal. In certain aspects, the plurality of sensor signals may include only motion sensor signals or only audio signals.

In certain aspects, at block 504, the computing device may determine probabilities of sub-event states (e.g., walking, stopped, opening door, sitting, closing door, etc.) based on the plurality of sensor signals using an artificial neural network for each of a plurality of time intervals. Sub-event states may be either explicit (e.g., walking, stopped, opening door, sitting, closing door, etc.) or implicit (e.g., automatically learned by the state model and the sequence model).

In certain aspects, the operations 500 may also include time synchronizing the plurality of signals. In this case, the determination of the probabilities of the sub-event states, at block 504, is based on the time-synchronized sensor signals. In certain aspects, the operations 500 may also include resampling each of the time-synchronized sensor signals such that the time-synchronized sensor signals have the same sampling rate. In this case, the determination of the probabilities of sub-event states may be based on the resampled time-synchronized sensor signals.

In certain aspects, at block 506, the operations 500 continue by detecting the event state based on the probabilities of the sub-event states via a state sequence model (e.g., hidden Markov model or hidden semi-Markov model). For example, detecting the event state at block 506 may include detecting a user entering a vehicle. In certain aspects, the operations 500 may also include determining a level of confidence that the event state has occurred via the state sequence model. In this case, the event state may be detected when the level of confidence exceeds a threshold, as described in more detail herein.

Figure 6:
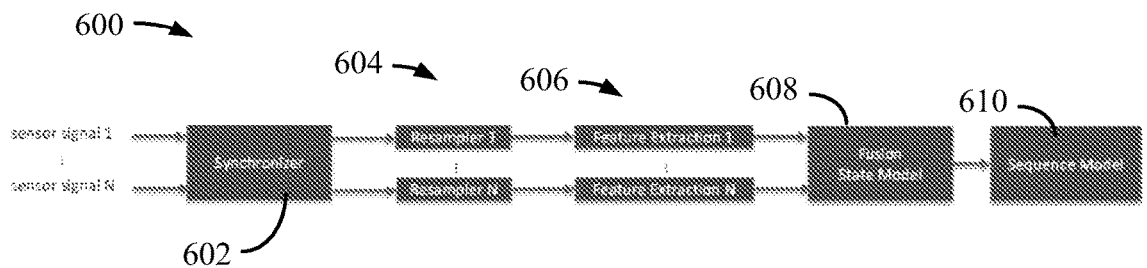
FIG. 6 is a block diagram of an example system for detecting an event state using sensor fusion by time synchronization and resampling, in accordance with certain aspects of the present disclosure

FIG. 6 is a block diagram of an example system 600 for detecting an event state using sensor fusion by time synchronization and resampling, in accordance with certain aspects of the present disclosure. As illustrated, multiple sensor signals (sensor signal 1 to sensor signal N) may be received. The sensor data may be acquired with a unified time stamp and synchronized using a synchronizer 602. The time-synchronized signals output by the synchronizer 602 are then resampled using resampler 604 (e.g., resampler 1 to N), as illustrated, to generate signals having the same sampling rate such that features of the sensor signals are calculated at the same sampling rate. Features may be extracted from each of the resampled sensor signals using feature extraction modules 606 (e.g., feature extraction modules 1 to N, N being any integer equal to or greater than 2), followed by a fusion state model 608 and a sequence model 610 used to calculate a detection confidence for specific event states, as described in more detail herein.

Figure 7:
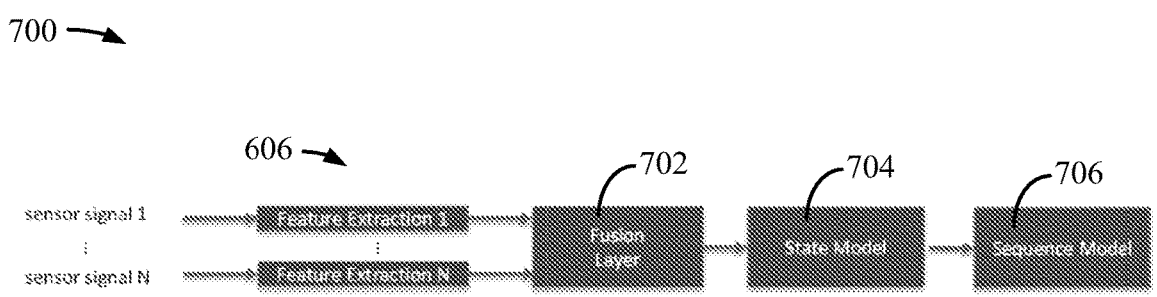
FIG. 7 is a block diagram of an example system for detecting an event state using sensor fusion by a fusion layer, in accordance with certain aspects of the present disclosure.

FIG. 7 is a block diagram of an example system 700 for detecting an event state using sensor fusion by a fusion layer, in accordance with certain aspects of the present disclosure. For example, in a case where time synchronization may not be important, the sensor features having various time scales may be directly merged using a fusion layer 702, after feature extraction. The output of the fusion layer may be updated at a rate corresponding to the highest update rate of the sensor features. For example, the fusion feature at the output of the fusion layer may be updated when any sensor feature generated at the output of any of the feature extraction modules is updated. The fusion feature is regularly sampled and fed to a state model 704 and a sequence model 706 to calculate a detection confidence for specific event states, as described in more detail herein.

Figure 8:
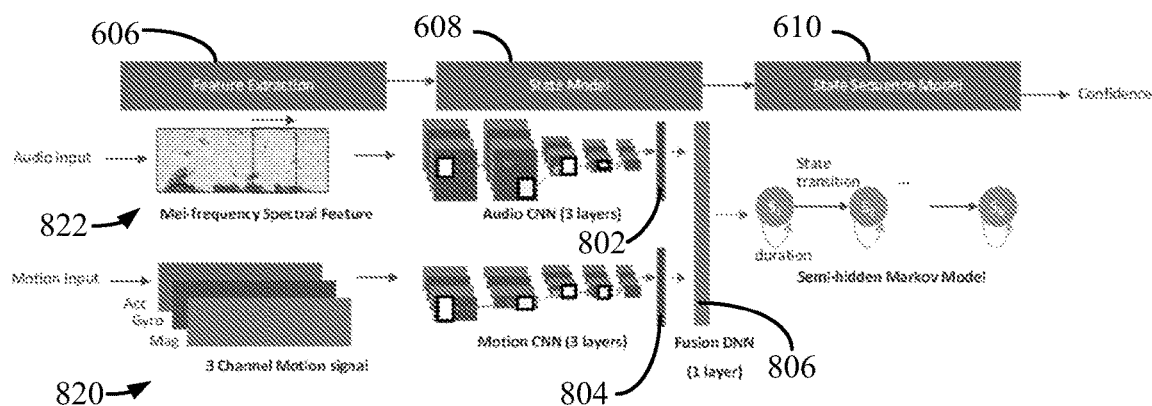
FIG. 8 is a block diagram of an example system for detecting an event state using an audio and motion fusion model, in accordance with certain aspects of the present disclosure.

FIG. 8 is a block diagram of an example system 800 for detecting an event state using an audio and motion fusion model, in accordance with certain aspects of the present disclosure. As illustrated, during feature extraction, a mel-frequency spectral feature 822 of an audio signal may be extracted. As used herein, a mel-frequency scale generally refers to a perceptual scale of pitches judged by listeners to be equal in distance from one another. A 20 logmel feature× 36 frames (20 ms×36=720 ms feature) may be extracted from the audio signal. Features may also be extracted from one or more motion sensor input signals. For example, features may be extracted from a three-channel motion signal 820 received from an accelerometer, a gyroscope, and a magnetometer, as illustrated. In certain aspects, a 3 dimension×36 samples (720 ms) feature may be extracted from the accelerometer signal, a 3 dimension×36 samples (720 ms) feature may be extracted from the gyroscope signal, and a 3 dimension×36 samples (720 ms) feature may be extracted from the magnetometer signal. In certain aspects, the audio signal and motion signal may be synchronized and resampled prior to feature extraction, as described with respect to FIG. 6.

The extracted features may be provided to a state model 608, as illustrated. For example, each of the extracted audio feature and motion feature may be provided to a three-layer convolutional neural network (CNN) to determine state probabilities corresponding to each of the plurality of sensor signals. Each three-layer CNN may include three convolution layers and a flattening layer 802, 804. The output of the last of the three convolution layers may be three-dimensional (e.g., channel×feature×time), which is then converted into a one-dimensional vector. The flattened outputs of the audio CNN and the motion CNN are concatenated into the one-dimensional vector and fed to the fusion layer 806 (e.g., a full-connection layer). For example, the outputs of the CNNs for the audio and motion signals may be fused using the fusion layer 806 (e.g., a single deep neural network (DNN)) to determine the probabilities of sub-event states (e.g., walking, stopped, opening door, sitting, closing door, etc.), followed by a sequence model 610 (also referred as a "state sequence model") to calculate a detection confidence for specific event states. For example, the sequence model 610 may calculate the detection confidence based on a sequence and duration of the sub-event states ($S_1$ to $S_N$), N being an integer equal to or greater than 2, as illustrated.

In certain aspects, the sequence model may be implemented as a hidden Markov model (HMM) or semi-Markov model (SMM), based on which the sequence model provides a confidence value corresponding to a particular event state (e.g., entering a vehicle). In certain aspects, a recurrent neural network (e.g., such as long short-term memory (LSTM) or a gated recurrent unit (GRU)) may be used to implement the sequence model. If the confidence value determined by the sequence model exceeds a particular threshold, the computing device may determine that the event state has occurred (e.g., the user has entered a vehicle), and may perform one or more actions based on the determination (e.g., activate global-positioning system (GPS)). In certain aspects, the sequence model (e.g., SMM) may be implemented with 15 sub-event states (e.g., walking, stopped, opening door, sitting, closing door, etc.) and 45 filler states (e.g., sub-events or actions that are not related to a vehicle entrance event).

Figure 9:
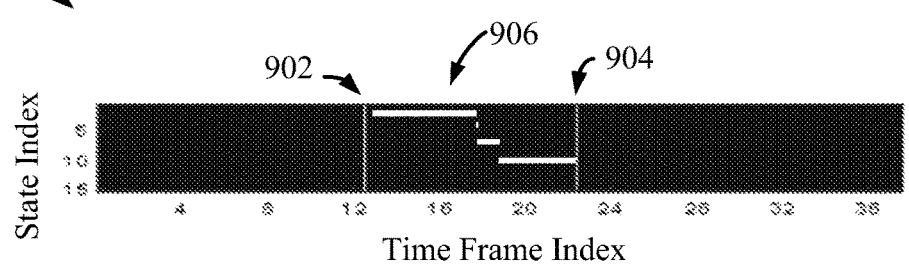
FIG. 9 is a timing diagram illustrating an example of a positive vehicle entry event detected based on occurrence of a sequence of sub-events, in accordance with certain aspects of the present disclosure.

FIG. 9 is a timing diagram 900 illustrating an example of a positive vehicle entry event detected based on occurrence of a sequence of sub-events, in accordance with certain aspects of the present disclosure. The lines 902, 904 represent the beginning and end, respectively, of a vehicle entry event, during which specific sub-events occur represented by indices 1-15 on the y-axis. The occurrence of the sub-events is indicated by lines 906 during the vehicle entry event. The sequence model 610 detects a sequence and duration of each of the sub-events as illustrated by lines 906, and provides a confidence value of the vehicle entry event, as described herein.

Figure 10:
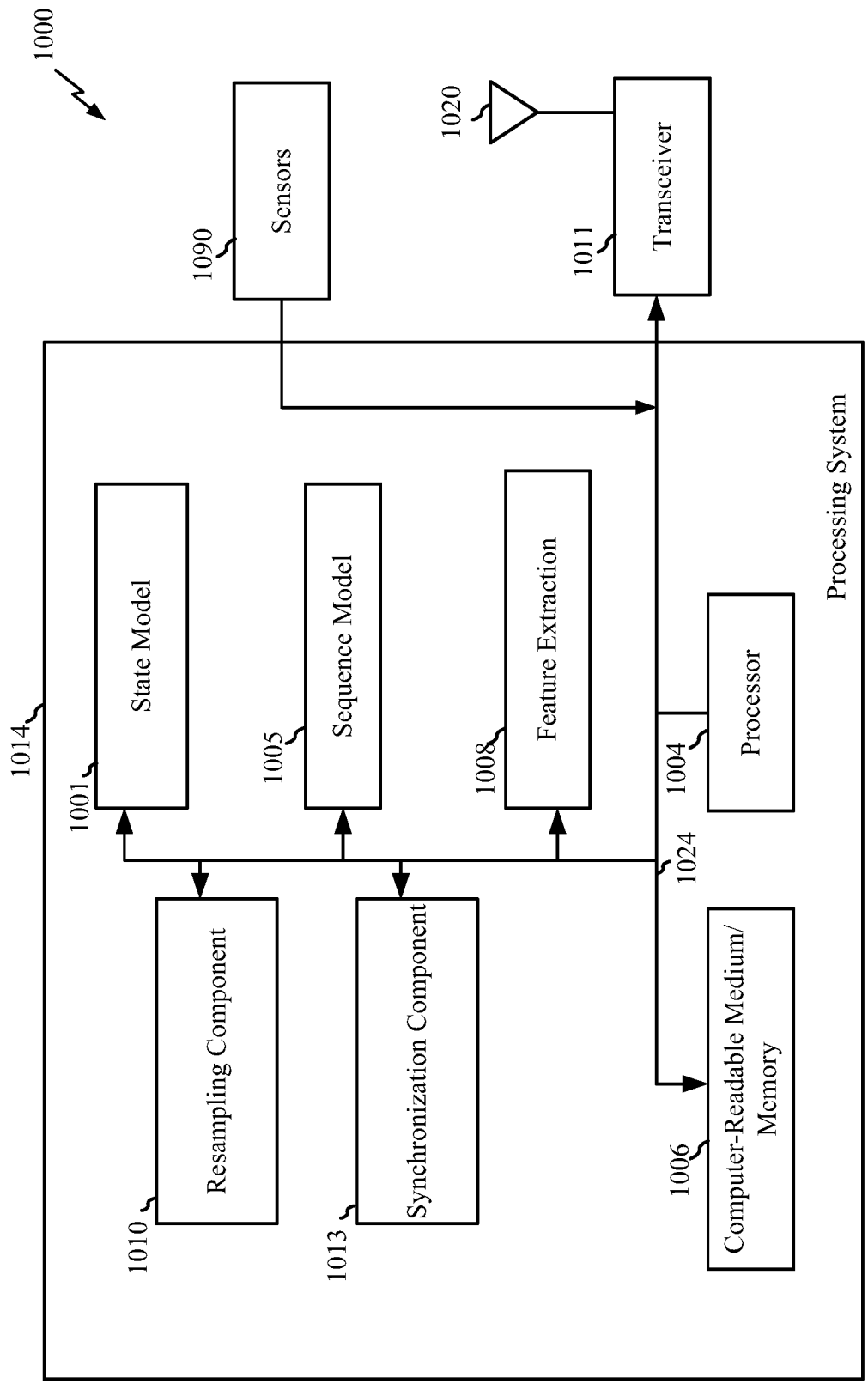
FIG. 10 illustrates various components that may be used in a computing device that may be employed to carry out operations and aspects described herein.

FIG. 10 illustrates various components that may be used in a computing device 1000 that may be employed to carry out operations and aspects described herein. For example, the computing device 1000 may implement operations 500 of FIG. 5.

The computing device 1000 may include a processing system 1014 and sensors 1090. In certain aspects, the computing device 1000 may be configured as a wireless device having a transceiver 1011 for communication via an antenna 1020. The processing system may include a processor 1004 which controls operation of the computing device 1000. The processor 1004 may also be referred to as a central processing unit (CPU). Memory 1006 (e.g., computer-readable medium), which may include both read-only memory (ROM) and random access memory (RAM), provides instructions and data to the processor 1004. A portion of the memory 1006 may also include non-volatile random access memory (NVRAM). The processor 1004 may perform logical and arithmetic operations based on program instructions stored within the memory 1006. The instructions in the memory 1006 may be executable to implement the methods described herein.

The processing system 1014 may include one or more other components used to implement the methods and aspects described herein. For example, the processor 1004 may be coupled to a feature extraction component 1008 for extracting features from one or more sensor signals (e.g., received from sensors 1090), a resampling component 1010 for resampling sensor signals, a synchronization component 1013 for synchronizing sensor signals, a state model component 1001 for determining probabilities of sub-events, and/or a sequence model component 1005 for detecting an event state, as described herein. For certain aspects, the processor 1004 may include or be implemented by an artificial neural network. The various components of the computing device 1000 may be coupled together by a bus system 1024, which may include a power bus, a control signal bus, and a status signal bus in addition to a data bus.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, means for receiving may comprise a feature extraction component, such as the feature extraction component 1008, or a synchronization component such as the synchronization component 1013. Means for determining (e.g., determining probabilities of sub-event states) may comprise a state model component, such as the state model component 1001. Means for detecting (e.g., detecting an event state) may comprise a sequence model component, such as the sequence model component 1005.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, such instructions may include instructions for performing the operations described herein and illustrated in FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for event state detection, comprising:
   receiving a plurality of sensor signals at a computing device;
   determining, at the computing device, probabilities of sub-event states based on the plurality of sensor signals using an artificial neural network for each of a plurality of time intervals; and
   detecting, at the computing device, an event state based on the probabilities of the sub-event states via a state sequence model.

2. The method of claim 1, wherein detecting the event state comprises detecting a user entering a vehicle.

3. The method of claim 1, wherein the plurality of sensor signals comprises an audio signal and at least one motion sensor signal.

4. The method of claim 3, wherein the at least one motion sensor signal comprises at least one of an accelerometer sensor signal, a gyroscope sensor signal, or a magnetometer sensor signal.

5. The method of claim 1, wherein the plurality of sensor signals comprises motion sensor signals.

6. The method of claim 1, wherein the plurality of sensor signals comprises an audio signal.

7. The method of claim 1, wherein determining the probabilities of the sub-event states comprises:
   determining state probabilities corresponding to each of the plurality of sensor signals via a convolutional neural network (CNN); and
   fusing the state probabilities via a deep neural network (DNN).

8. The method of claim 7, wherein the CNN comprises three neural network layers.

9. The method of claim 7, wherein the DNN comprises a single neural network layer.

10. The method of claim 1, wherein the state sequence model comprises a hidden Markov model or a hidden semi-Markov model.

11. The method of claim 1, wherein the detection of the event state comprises detecting a sequence of the sub-event states based on the determination of the probabilities.

12. The method of claim 11, wherein the event state is detected based on the sequence and a duration of each of the sub-event states.

13. The method of claim 11, wherein the sequence of the sub-event states comprises a sequence of 15 sub-event states.

14. The method of claim 1, further comprising:
   determining a level of confidence that the event state has occurred via the state sequence model, wherein the event state is detected when the level of confidence exceeds a threshold.

15. The method of claim 1, further comprising extracting a feature from each of the plurality of sensor signals, wherein the probabilities of the sub-event states are determined based on the extracted features.

16. The method of claim 1, wherein the computing device comprises a wearable or mobile device and wherein the plurality of sensor signals is received from sensors of the wearable or mobile device.

17. The method of claim 1, further comprising:
   time synchronizing the plurality of sensor signals, wherein the determination of the probabilities of the sub-event states is based on the time-synchronized sensor signals.

18. The method of claim 17, further comprising:
   resampling each of the time-synchronized sensor signals such that the time-synchronized sensor signals have the same sampling rate, wherein the determination of the probabilities of sub-event states is based on the resampled time-synchronized sensor signals.

19. The method of claim 1, further comprising performing an action based on the detection of the event state.

20. The method of claim 19, wherein performing the action comprises at least one of:
   activating a navigation system;
   displaying information for a user; or
   transmitting an indication to a vehicle to perform one or more actions.

21. The method of claim 1, wherein the plurality of sensor signals comprises at least two different types of sensor signals.

22. An apparatus for event state detection, comprising:
a plurality of sensors; and
a processing system configured to:
  receive a plurality of sensor signals from the plurality of sensors;
  determine probabilities of sub-event states based on the plurality of sensor signals using an artificial neural network for each of a plurality of time intervals; and
  detect an event state based on the probabilities of the sub-event states via a state sequence model.

23. The apparatus of claim 22, wherein the processing system is configured to detect the event state by detecting a user entering a vehicle.

24. The apparatus of claim 22, wherein the processing system is further configured to determine a level of confidence that the event state has occurred via the state sequence model, wherein the event state is detected when the level of confidence exceeds a threshold.

25. The apparatus of claim 22, wherein the processing system is further configured to extract a feature from each of the plurality of sensor signals, wherein the probabilities of the sub-event states are determined based on the extracted features.

26. The apparatus of claim 22, wherein the processing system is further configured to time synchronize the plurality of sensor signals, wherein the determination of the probabilities of the sub-event states is based on the time-synchronized sensor signals.

27. The apparatus of claim 26, wherein the processing system is further configured to resample each of the time-synchronized sensor signals such that the time-synchronized sensor signals have the same sampling rate, wherein the determination of the probabilities of sub-event states is based on the resampled time-synchronized sensor signals.

28. The apparatus of claim 22, wherein the processing system is further configured to perform an action based on the detection of the event state.

29. An apparatus for event state detection, comprising:
  means for receiving a plurality of sensor signals;
  means for determining probabilities of sub-event states based on the plurality of sensor signals using an artificial neural network for each of a plurality of time intervals; and
  means for detecting an event state based on the probabilities of the sub-event states via a state sequence model.

30. A non-transitory computer-readable medium having instructions stored thereon to cause a computing device to:
  receive a plurality of sensor signals;
  determine probabilities of sub-event states based on the plurality of sensor signals using an artificial neural network for each of a plurality of time intervals; and
  detect an event state based on the probabilities of the sub-event states via a state sequence model.

* * * * *